(12) United States Patent
Duckett

(10) Patent No.: US 10,339,429 B2
(45) Date of Patent: Jul. 2, 2019

(54) METHOD OF QUICKLY CONFIGURING AN RFID PRINTER

(71) Applicant: Avery Dennison Retail Information Solutions LLC, Mentor, OH (US)

(72) Inventor: Jeanne F. Duckett, Franklin, OH (US)

(73) Assignee: AVERY DENNISON RETAIL INFORMATION SERVICES LLC, Mentor, OH (US)

( * ) Notice: Subject to any disclaimer, the term of this patent is extended or adjusted under 35 U.S.C. 154(b) by 0 days.

(21) Appl. No.: 14/556,489

(22) Filed: Dec. 1, 2014

(65) Prior Publication Data
US 2016/0154618 A1    Jun. 2, 2016

(51) Int. Cl.
| | | |
|---|---|---|
| G06K 15/02 | (2006.01) |
| B41J 3/44 | (2006.01) |
| G06F 3/12 | (2006.01) |
| G06K 1/12 | (2006.01) |
| B41J 3/407 | (2006.01) |
| G06K 17/00 | (2006.01) |
| G06K 19/07 | (2006.01) |

(52) U.S. Cl.
CPC .......... *G06K 15/024* (2013.01); *B41J 3/4075* (2013.01); *B41J 3/44* (2013.01); *G06F 3/1204* (2013.01); *G06F 3/1229* (2013.01); *G06F 3/1285* (2013.01); *G06K 1/12* (2013.01); *G06K 17/0025* (2013.01); *G06K 19/0723* (2013.01)

(58) Field of Classification Search
CPC ......... G06K 2017/0083; G06K 15/024; G06K 19/0723; G06K 17/0025
See application file for complete search history.

(56) References Cited

U.S. PATENT DOCUMENTS

| | | | |
|---|---|---|---|
| 2005/0058483 A1 | 3/2005 | Chapman et al. | |
| 2005/0274800 A1 | 12/2005 | Chapman et al. | |
| 2007/0023516 A1* | 2/2007 | Chapman ........... | G06K 17/0025 235/432 |
| 2008/0093027 A1* | 4/2008 | Niwa ..................... | B41J 3/4075 156/387 |
| 2009/0279115 A1 | 11/2009 | Martin | |
| 2010/0208309 A1* | 8/2010 | Mizumukai .......... | G03G 15/607 358/448 |
| 2010/0216333 A1 | 8/2010 | Hane et al. | |
| 2011/0115611 A1* | 5/2011 | Tsirline .................... | G06K 1/18 340/10.2 |
| 2012/0039651 A1* | 2/2012 | Yamaguchi ............ | B41J 3/4075 400/613 |

(Continued)

OTHER PUBLICATIONS

International Search Report and Written Opinion dated Mar. 1, 2016 for International Application No. PCT/US2015/062073.

*Primary Examiner* — Peter K Huntsinger
(74) *Attorney, Agent, or Firm* — Avery Dennison Retail Information Services LLC

(57) ABSTRACT

Aspects of the invention relate to methods for automatically configuring a printer, such as a RFID printer with minimal effort from the user. According to one embodiment of the present invention, a user is able to automatically configure one or more of the following non-exhaustive list of printer settings by entering only an inlay designator and an inlay offset: a first TID position, an encode zone, a TID singulate, a read power, a write power, an encode while the web is moving flag, a stop to encode position and a maximum speed to encode while the web is moving.

14 Claims, 14 Drawing Sheets

(56) References Cited

U.S. PATENT DOCUMENTS

2013/0063753 A1     3/2013   Mitsui
2014/0268234 A1*   9/2014   Iida .................... G06K 15/4065
                                                                              358/1.15

* cited by examiner

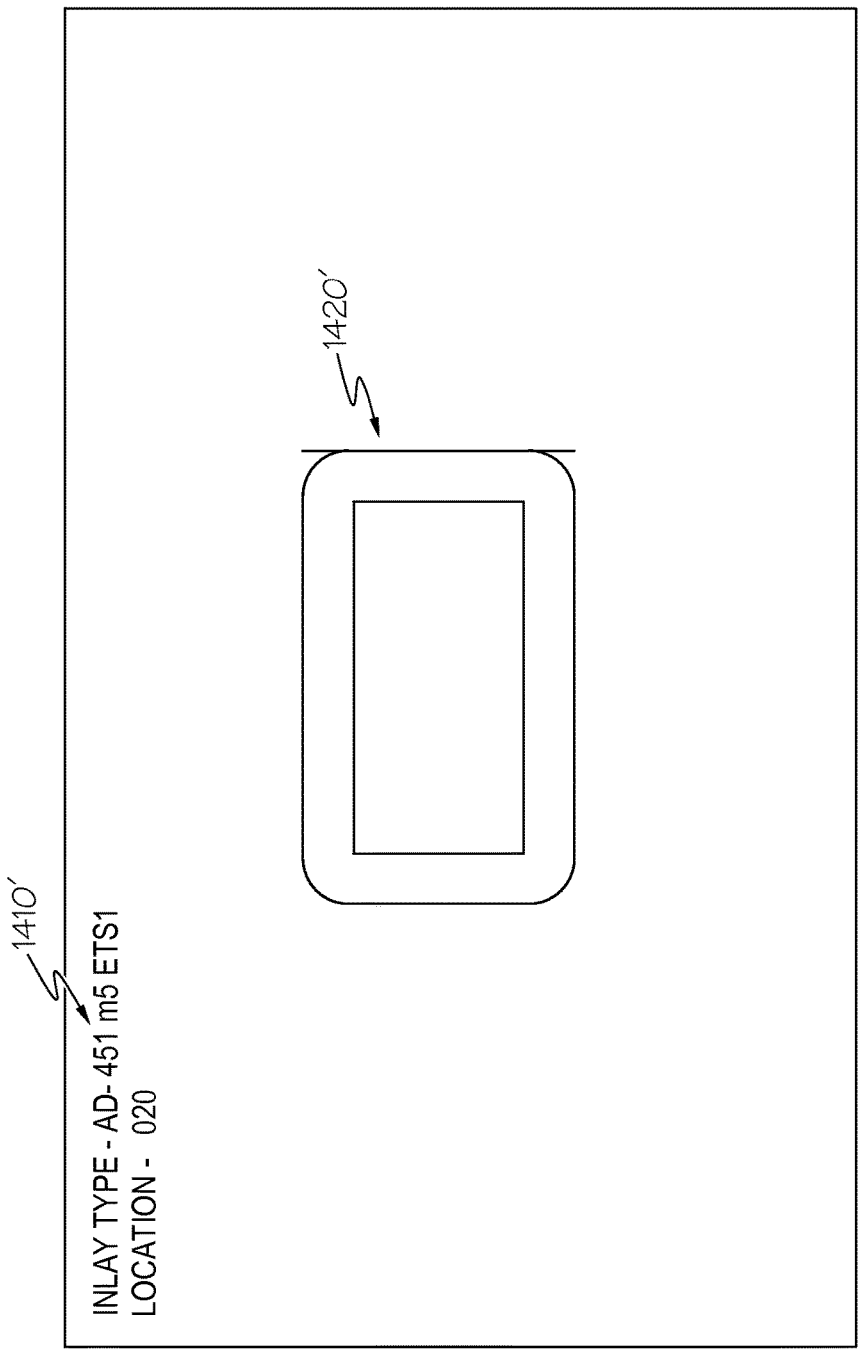

METHOD OF QUICKLY CONFIGURING AN RFID PRINTER

BACKGROUND

The present invention relates generally to a process for quickly and efficiently configuring a printer such as a radio frequency identification (RFID) printer. More particularly, the present disclosure relates to a process of utilizing information on a converted roll of RFID media and firmware in an embedded printer to automatically configure the printer.

RFID tags are electronic devices that may be affixed to items whose presence is to be detected and/or monitored. The presence of an RFID tag, and therefore the presence of the item to which the RFID tag is affixed, may be checked and monitored by devices known as "readers" or "reader panels." Readers typically transmit radio frequency signals to which the RFID tags respond. Each RFID tag can store a unique identification number. The RFID tags respond to reader-transmitted signals by providing their identification number and additional information stored on the RFID tag based on a reader command to enable the reader to determine an identification and characteristics of an item.

Current RFID tags and labels are produced through the construction of an inlay which includes a chip connected to an antenna applied to a substrate. The inlay is then inserted into a single tag or label. These labels or tags are then printed by either conventional printing processes, such as flexographic processes, and then variable information may be printed either with the static information or singularly. The chips are then encoded in a printer which has a read/encoding device or separately by a reader/encoding device. There may also be a separate RFID reader/encoding device for the purpose of verifying the information in the chip.

When printers, such as RFID printers, are purchased they are oftentimes not configured, which requires the user to then manually configure the printer device. Due to the numerous settings and verification options that must be reviewed and selected (e.g., location of the inlay in the field, power settings, etc.) during the printer configuration process, configuration of a RFID printer can be both time consuming and complicated, and oftentimes must be carried out by skilled personnel. If there is no skilled person at the particular location where the printer is to be used, then it is necessary for someone to travel from another location in order to configure the printer. This is obviously both undesirable and inefficient.

Consequently, there exists a long felt need in the art for a method of quickly and efficiently configuring a printer, such as an RFID printer. There is also a need in the art for a method of configuring an RFID printer that requires minimal effort on the part of the user. Finally, there is a need for a solution that is both relatively easy and inexpensive to implement.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a method of configuring a printer, such as an RFID printer, comprising the steps of: inputting inlay information into said printer; comparing said inputted inlay information to a list of pre-existing inlay information stored in said printer to determine if a match exist; and, if a match exists, inputting an inlay offset into said printer. In an alternate embodiment the information from the supply roll can be entered through a NFC label on the roll which is read by the printer or the information can be transmitted through any of the printer normal communication channels.

In a preferred embodiment of the present invention, the method further comprises the steps of feeding a media into the printer to determine an inlay pitch for the media; comparing the inlay pitch to a minimum inlay pitch; and selecting one of a first printer configuration or a second printer configuration based on the results of the comparison, wherein each of first printer configuration and second printer configuration comprises one or more of the following settings: a first TID position, an encode zone, a TID singulate, a read power, a write power, an encode while the web is moving flag, a stop to encode position, chip encode speed and a maximum speed to encode while the web is moving.

In a further preferred embodiment, the method further comprises the steps of determining if new inlay information is available from a communication port and updating the list of pre-existing inlay information stored in the printer to include the new inlay information.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 14 illustrates a label that would be placed on the roll of RFID transponders.

DETAILED DESCRIPTION

Figure 1:
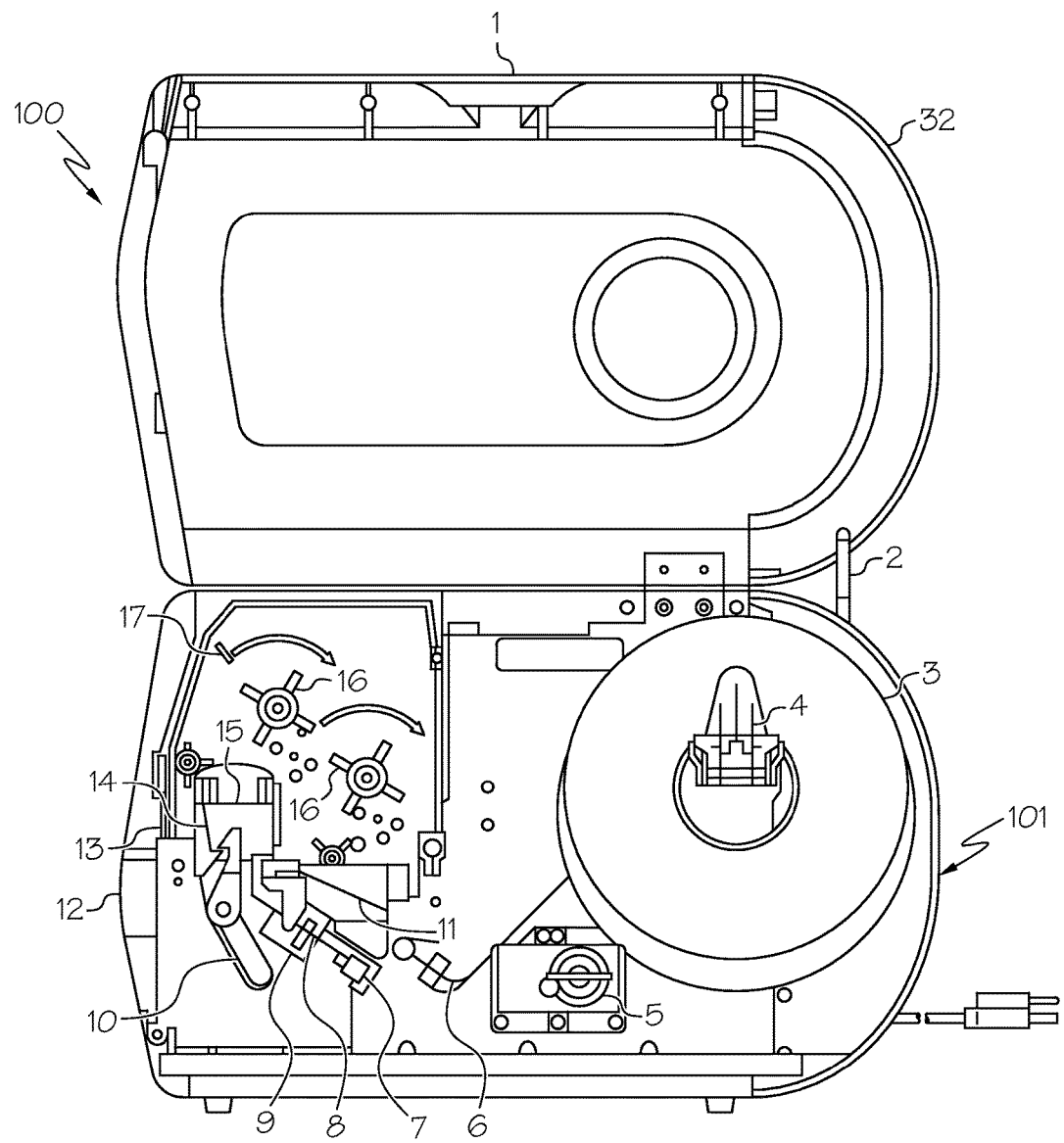
FIG. 1 illustrates a front, perspective view of one embodiment of a thermal tabletop and industrial printer upon which the present invention may be used.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Referring initially to the drawings, FIG. 1 illustrates an example of a thermal tabletop and/or industrial printer device 100 upon which the present invention may be used. In a preferred embodiment, the thermal tabletop and/or industrial printer 100, comprises a reader and/or encoding device, as well as a verification device. The reader and/or encoding device can read and program an RFID device, such as a RFID chip, that is contained in an inlay which may or may not be incorporated into a label, tag, or any other desired product, and which can also print onto the product without damaging or otherwise undesirably affecting the RFID device. The inlay may also be affixed directly to the product without necessarily being incorporated into a label or tag, such as through use of an adhesive to affix the inlay to the product.

In some exemplary embodiments, the products can be arranged into sheets or rolls, and multiple products can be printed, encoded, or verified at one time, in a sequential manner, simultaneously or substantially simultaneously. In some exemplary embodiments, reader and chip/antenna configurations can allow the encoding and verification to occur in line, so that printing, encoding, variable data imaging, verifying, and finishing can all be completed in one continuous process. As used herein a continuous process includes both a roll to roll configuration, and a sheet fed process in which there is no stopping of the process. Continuous may also include a slight incremental stopping, indexing, advancing or the like which does not last longer than a couple of seconds.

Printing as provided herein may be accomplished by using any number of processes, including impact and non-impact printers, flexographic, gravure, ink jet, electrostatic and the like just to provide some representative examples. Static printing may include company logos, manufacturers' information, size, color and other product attributes. Variable printing may include identification numbers, bar codes, pricings, store location, marketing details and such other information as a retailer or brand owner may decide is required.

Exemplary RFID devices, e.g. inlays, tags, labels and the like are available from Avery Dennison RFID Company and Avery Dennison Retail Information Services of Greensboro, N.C. and Westborough, Mass., respectively. Such devices may be provided in any number of antenna and size configurations depending on the needs or end-use applications for which the product is intended.

FIGS. 1-7 disclose multiple views of the industrial printer 100, and are described below. The printer 100 can be any suitable size, shape, and configuration as is known in the art without affecting the overall concept of the invention. One of ordinary skill in the art will appreciate that the interior and/or exterior shape of the printer 100 as shown in FIGS. 1-7 for illustrative purposes only and many other shapes of the printer 100 are well within the, scope of the present disclosure. Although dimensions of the printer 100 (i.e., length, width, and height) are important, the printer 100 may be any shape that ensures optimal high speed encoding and verification.

Generally referring to FIG. 1, the thermal tabletop and industrial printer 100 have a generally rectangular shape with a printer cover 101, an access door 12 and a handle 1. The access door 12 can be actuated via the handle 1 to provide access to the front of the printer 100 and to load supplies. Once the front door 12 is opened, the user installs the supply roll 3 on the supply roll holder 4. The supply roll 3 contains supplies for the printer 100 to print on. Then, the liner take-up spindle 5 acts as a rewind holder for spent liner for adhesive backed labels.

Furthermore, the printer 100 comprises a supply damper 6 that helps to remove vibration from the supply roll 3 to improve print quality, and an out of stock switch 7 provides an on/off indication if supplies are loaded in the printer 100, or if the printer 100 is in need of supplies. A supply guide or frame 8 holds and centers supplies. Further, an array sensor (shown in FIG. 2 as 35) is attached to the supply guide to detect and accommodate minor variations in aperture location. An upper guide 11 guides supplies within the printer 100, and a loading label (shown in FIG. 2 as 18) is a label indicating the supply path for users to load supplies into the printer 100. The printer further comprises a print head 14. The print head 14 is a thermal print head such that the printer 100 automatically detects dot density. Additionally, the printer comprises a print head holder 15 which is a cast aluminum piece that the print head 14 is installed on to secure the print head 14 in place. Further, a release handle 10 releases the print head 14 from the holder 15 when needed.

The printer 100 also comprises a ribbon spindle 16 and a ribbon take-up 17. The ribbon spindle 16 is a DC motor-controlled supply for ribbon, and the ribbon take-up 17 is a DC motor-controlled takeup for ribbon. Further, a wireless antenna 2 is also included within the printer 100. The wireless antenna 2 may be any suitable wireless antenna known in the art for communicating with a router or other device, such as an 802.11 b/g/n dual band antenna. In a preferred embodiment, the printer comprises two other antennas. An RFID antenna 9 to allow for the RFID encoding of supplies, and an RFID verifier antenna 13, which is an external antenna for reading RFID supplies.

Figure 2:
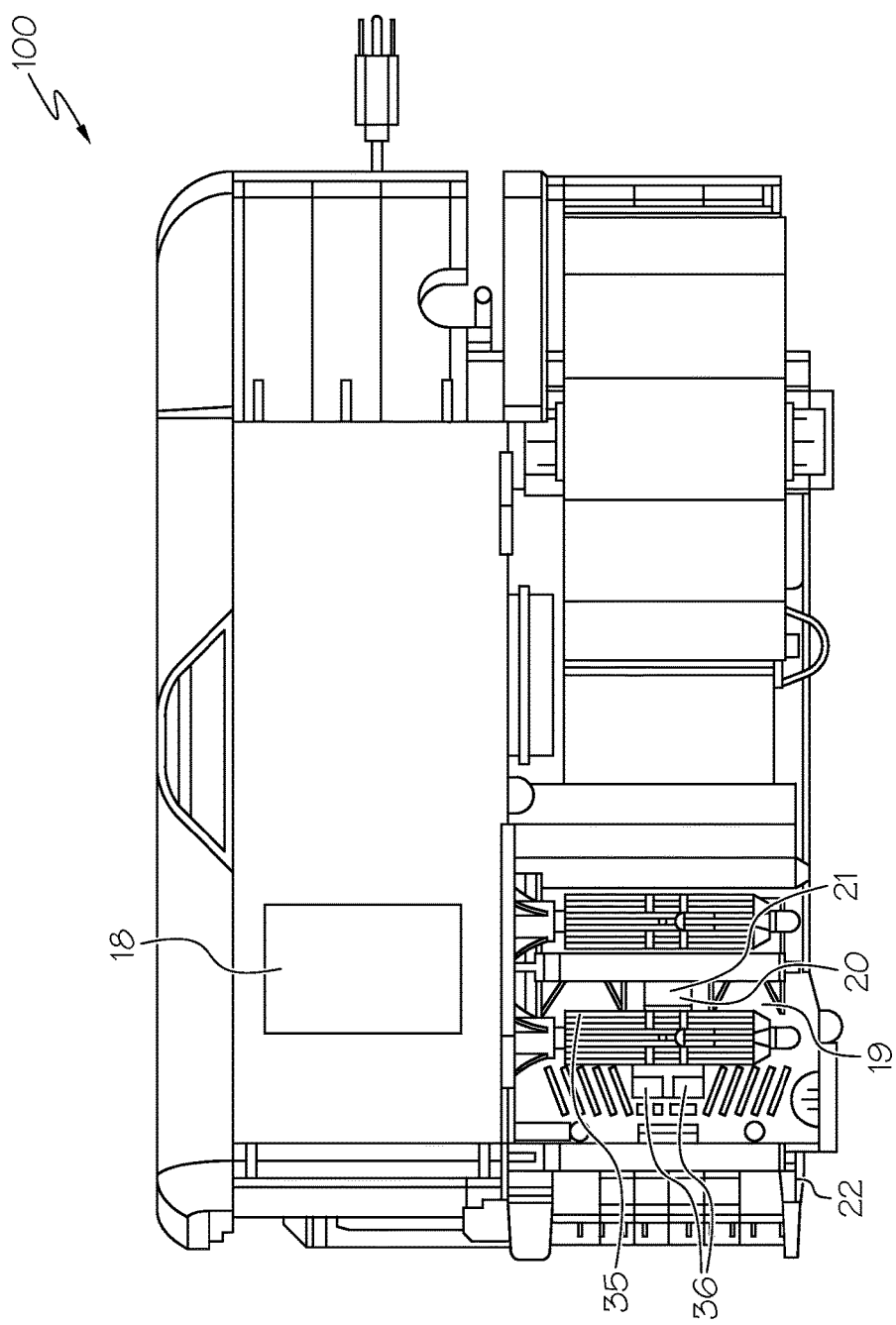
FIG. 2 illustrates a top, perspective view of the thermal tabletop and industrial printer of FIG. 1.

Generally referring to FIG. 2, the printer 100 comprises an overhead LED (light emitting diode) sensor cap 19 which covers the overhead LED board 20 which is a reflective supply sensor LED. Further, the printer includes an LED cap 21 which is a reflective supply sensor reflector, and an index sensor 35 which is a unique array sensor that automatically detects aperture sense marks. Specifically, the lighted sensor array 35 automatically senses the position of holes disposed through the web which are used for sense marking, and correctly indexes the printing to the RFID tags. By using the sensor array 35, the printer 100 can determine which of the individual sensors within the array should be used for the indexing to account for manufacturing variations. Thermal printhead (see FIG. 1) can be removed for replacement by printer release tabs shown in 36. The supply path is lit for user convenience as shown by Supply Path Light Embedded in supply guide 22.

Figure 3:
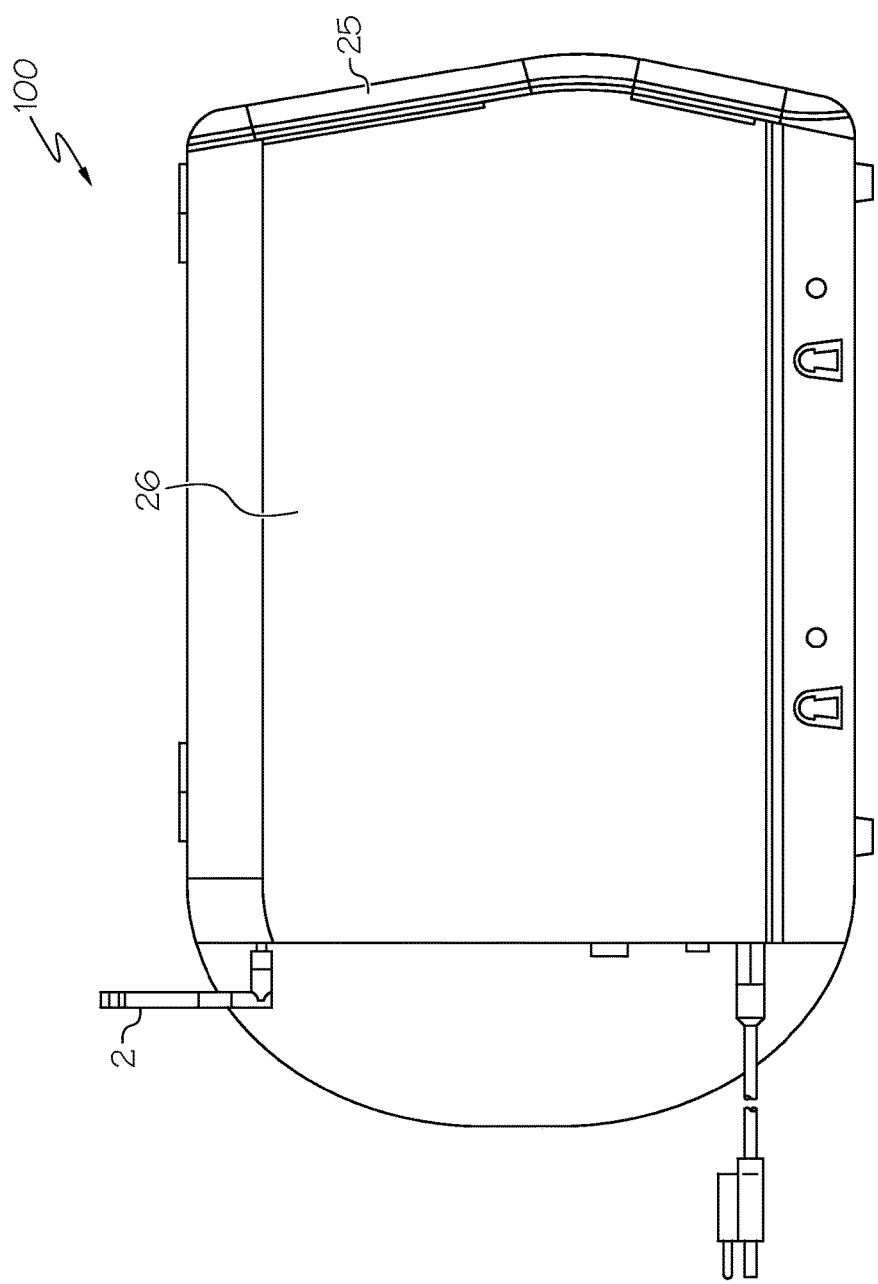
FIG. 3 illustrates a back, perspective view of the thermal tabletop and industrial printer of FIG. 1 with the cover on in accordance with the disclosed architecture.
Figure 4:
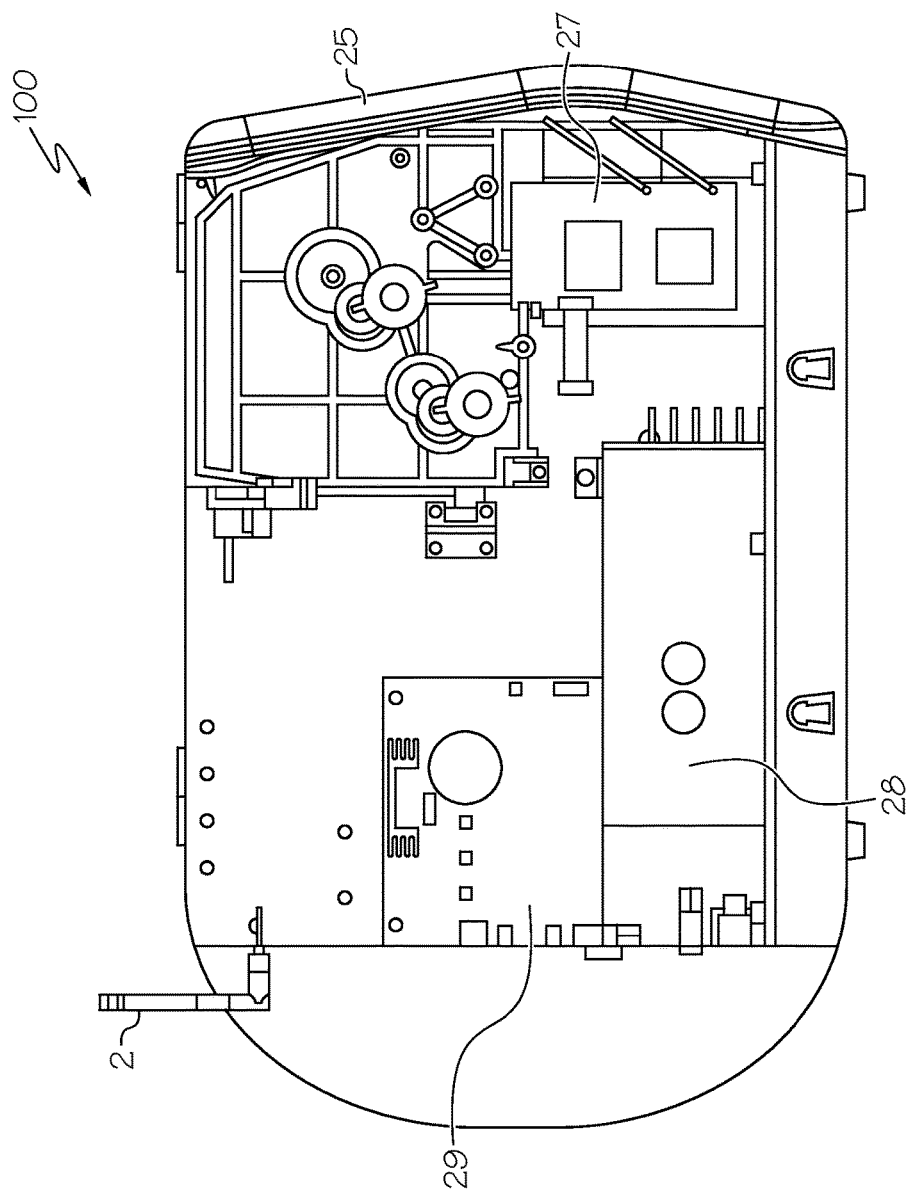
FIG. 4 illustrates a back, perspective view of the thermal tabletop and industrial printer of FIG. 1 without the cover in accordance with the disclosed architecture.

Generally referring to FIG. 3, the back of the printer 100 comprises a back cover 26 that covers the electronics panel (shown in FIG. 4). A display panel 25 displays a user interface, and the wireless antenna 2 (as shown in FIG. 1) can also be seen on the back of the printer 100. Generally referring to FIG. 4, the back of the printer 100 is shown without the cover 26. The CPU board 29 or main PC board is shown, as well as the RFID I/O board 27 which is a module that contains both the encoding and verification modules. The power supply 28 which is the main supply for power in the printer 100 is also shown at the back of the printer 100. Furthermore, the display panel 25 (as shown in FIG. 3), and the wireless antenna 2 (as shown in FIG. 1) can both be seen in FIG. 4 as well.

Figure 5:
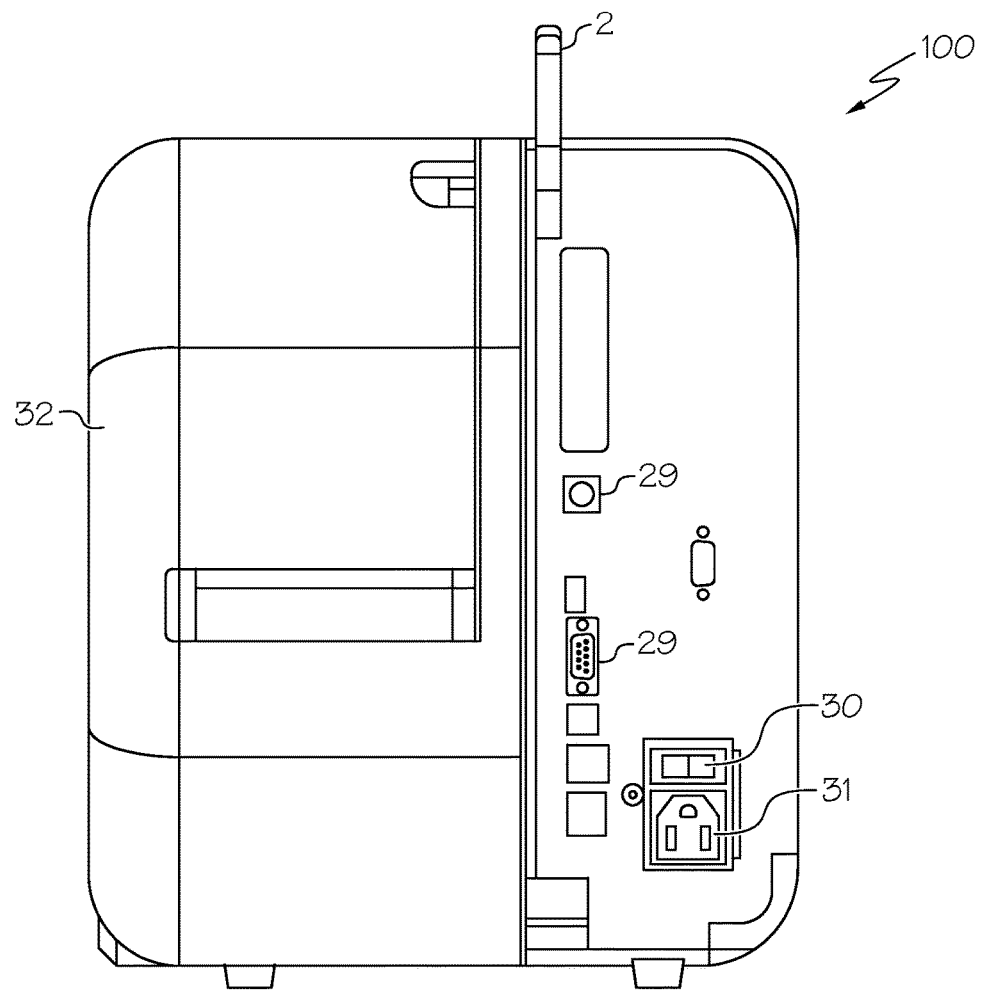
FIG. 5 illustrates a right, perspective view of the thermal tabletop and industrial printer of FIG. 1.
Figure 6:
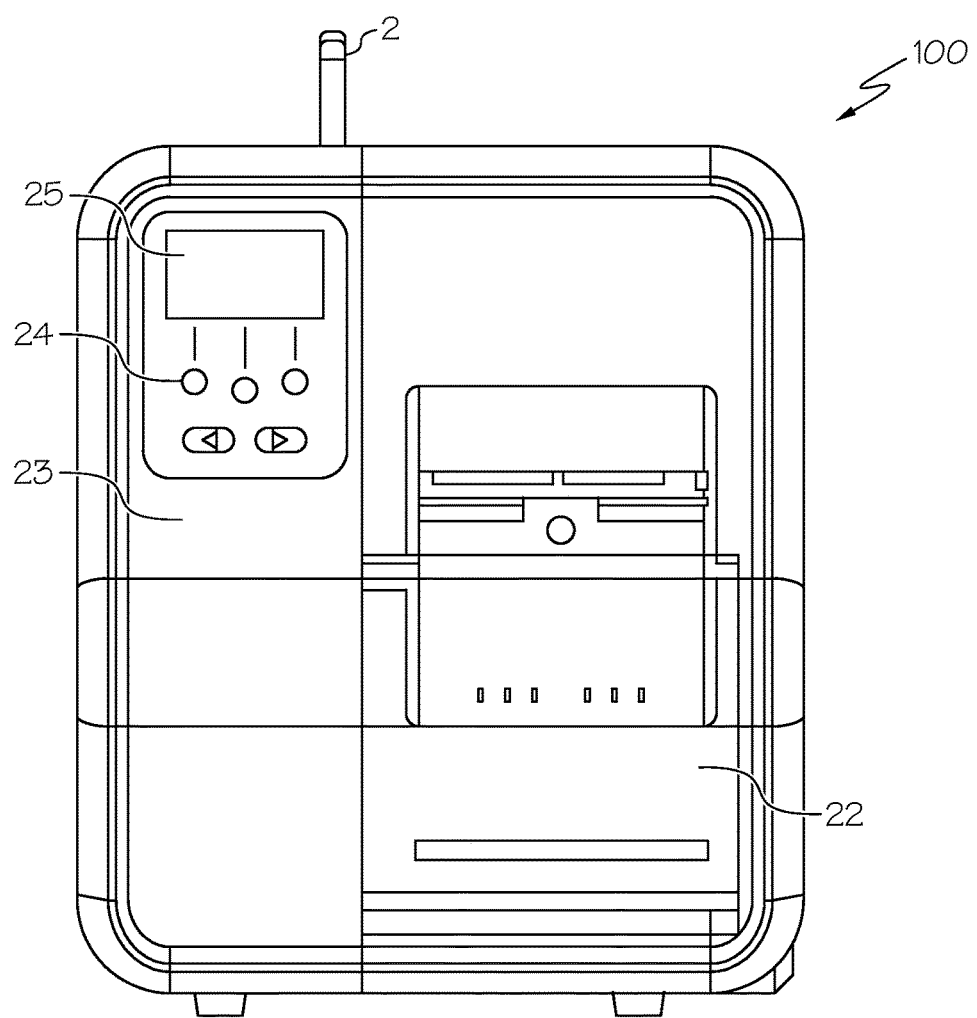
FIG. 6 illustrates a left, perspective view of the thermal tabletop and industrial printer of FIG. 1.

Generally referring to FIG. 5, the right side of the printer 100 is shown. The right side of the printer 100 shows the front cover 32, as well as the wireless antenna 2 (as shown in FIG. 1). Further, the CPU board 29 (as shown in FIG. 4) is shown, as well as an I/O switch 30 and I/O outlet 31. The communication ports on CPU board 29 are visible in this view. They include a USB Host port, USB device port, serial port and Ethernet IEEE 802.3 compliant port. Generally referring to FIG. 6, the left side of the printer 100 is shown. The left side of the printer 100 shows the wireless antenna 2 (as shown in FIG. 1), as well as a supply door 22 that secures and allows access to the supply roll 3. Further, a NFC I2C chip 23 is also disclosed which provides unique capability to the printer 100 and allows the printer 100 to communicate directly with the main processor through a bridge. Additionally, the printer 100 comprises a display panel 25 which includes a keypad 24. In another embodiment display panel 25 could be a touch screen.

In a preferred embodiment, the printer 100 includes a plurality of keys including the keypad 24 and a trigger key. The keypad 24 may be utilized to enter alpha-numeric data to the printer 100. Alternatively, the keypad 24 may have only a limited number of keys that are actuable in accordance with information depicted on a display 25 for selecting a number of operations of the printer, for example, feeding a web of record members through the printer 100, displaying status information, etc. In another form HID-USB compliant device can be plugged into CPU board 29 enabling a larger access to keys. The trigger key may be actuable by a user in various modes of the printer 100 to actuate the printing system and/or the RFID read/write module 34. Alternatively, one or more of these devices can be actuated automatically by a controller of the printer 100 in accordance with a stored application program. In addition to displaying status information or data entered via the keypad 24, the display 25 may also be controlled to provide prompts to the user to actuate the trigger key and/or other keys so as to control various operations of the printer 100.

Figure 7:
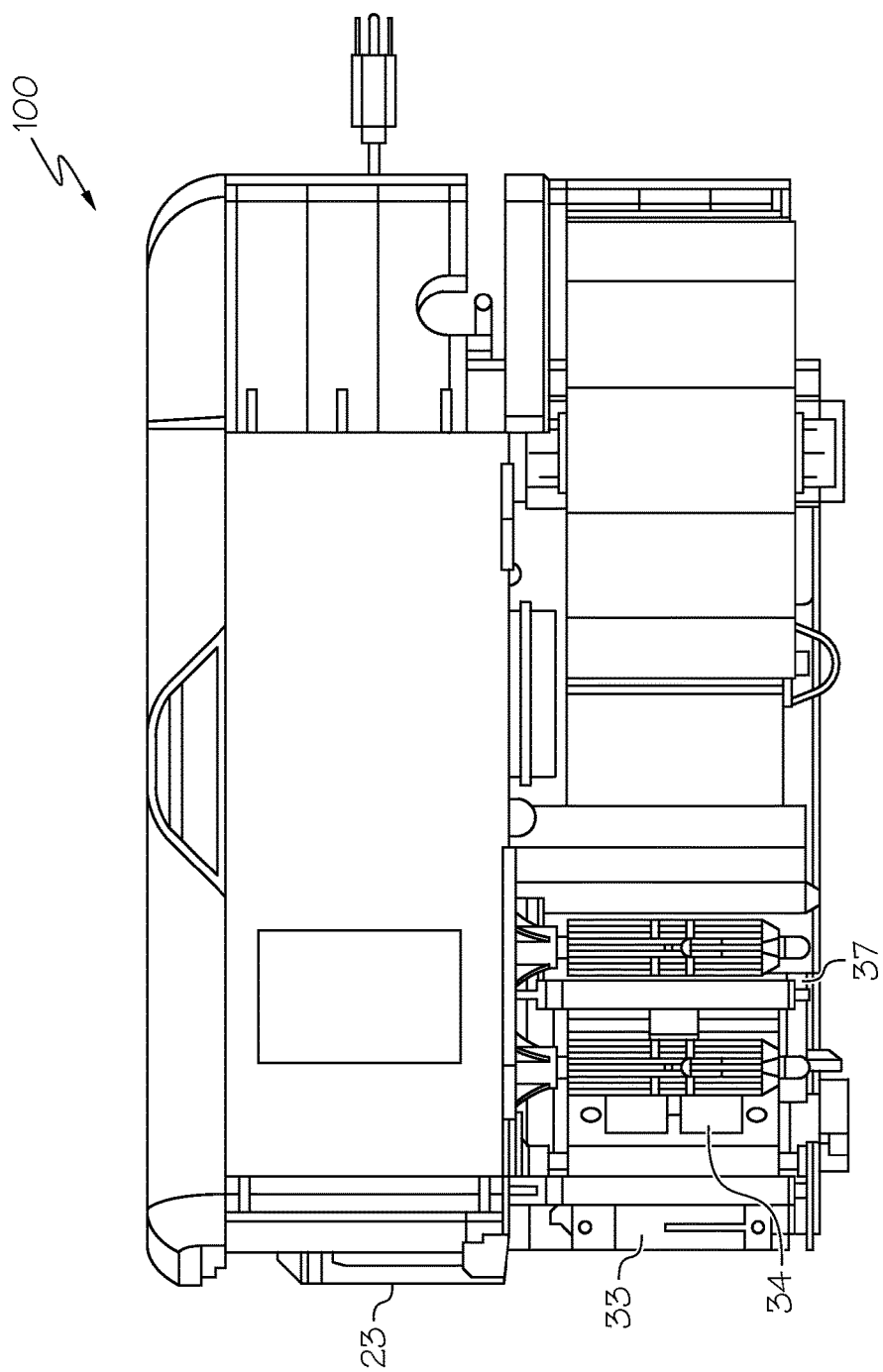
FIG. 7 illustrates a top, perspective view of an alternate embodiment of the thermal tabletop and industrial printer of FIG. 1, which also includes an RFID verifier and an RFID encoder.

Generally referring to FIG. 7, the top, perspective view of the printer 100 discloses the RFID verifier 33 and the RFID encoder 34 (as shown in FIG. 1 as antennas 9 and 13 respectively). Specifically, the RFID encoder 34 encodes RFID tags while the web is moving, and the RFID verifier 33 verifies the data encoded to the RFID tags.

In another embodiment, the printer 100 includes a microprocessor and a memory (not shown). The memory includes non-volatile memory such as flash memory and/or a ROM such as the EEPROM. The memory also includes a RAM for storing and manipulating data. In accordance with a preferred embodiment of the present invention, the microprocessor controls the operations of the printer 100 in accordance with an application program that is stored in the flash memory. The microprocessor may operate directly in accordance with the application program. Alternatively, the microprocessor can operate indirectly in accordance with the application program as interpreted by an interpreter program stored in the memory or another area of the flash memory.

The microprocessor is operable to select an input device to receive data therefrom and to manipulate the receive data and/or combine it with data received from a different input source in accordance with a stored application program. The microprocessor couples the selected, combined and/or manipulated data to the printing system for printing on a record member. The microprocessor may select the same or different data to be written to an external RFID chip. The microprocessor couples the data selected for writing to the RFID read/write module wherein the data is written in encoded form to the external RFID chip. Similarly, the microprocessor can select the same or different data for storage in a transaction record in the RAM and for uploading via the communication interface to a host. The processor is operable to select data to be coupled to the printing system independently of the data that the processor selects to be coupled to the RFID read/write module to provide greater flexibility than has heretofore been possible.

Figure 11:
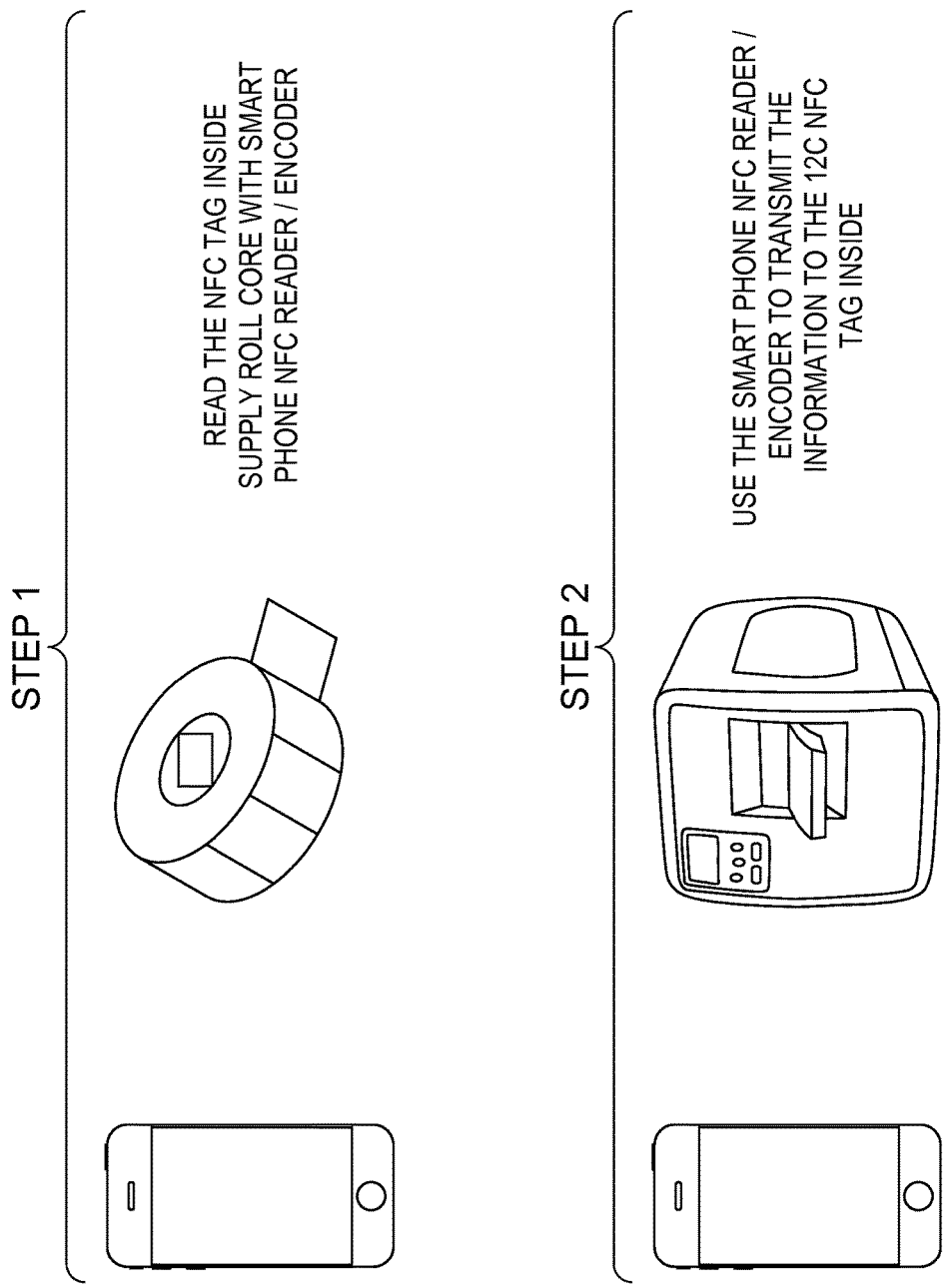
FIG. 11 illustrates the process of using NFC on a roll and a smart phone of supplies to update the information in the printer.
Figure 12:
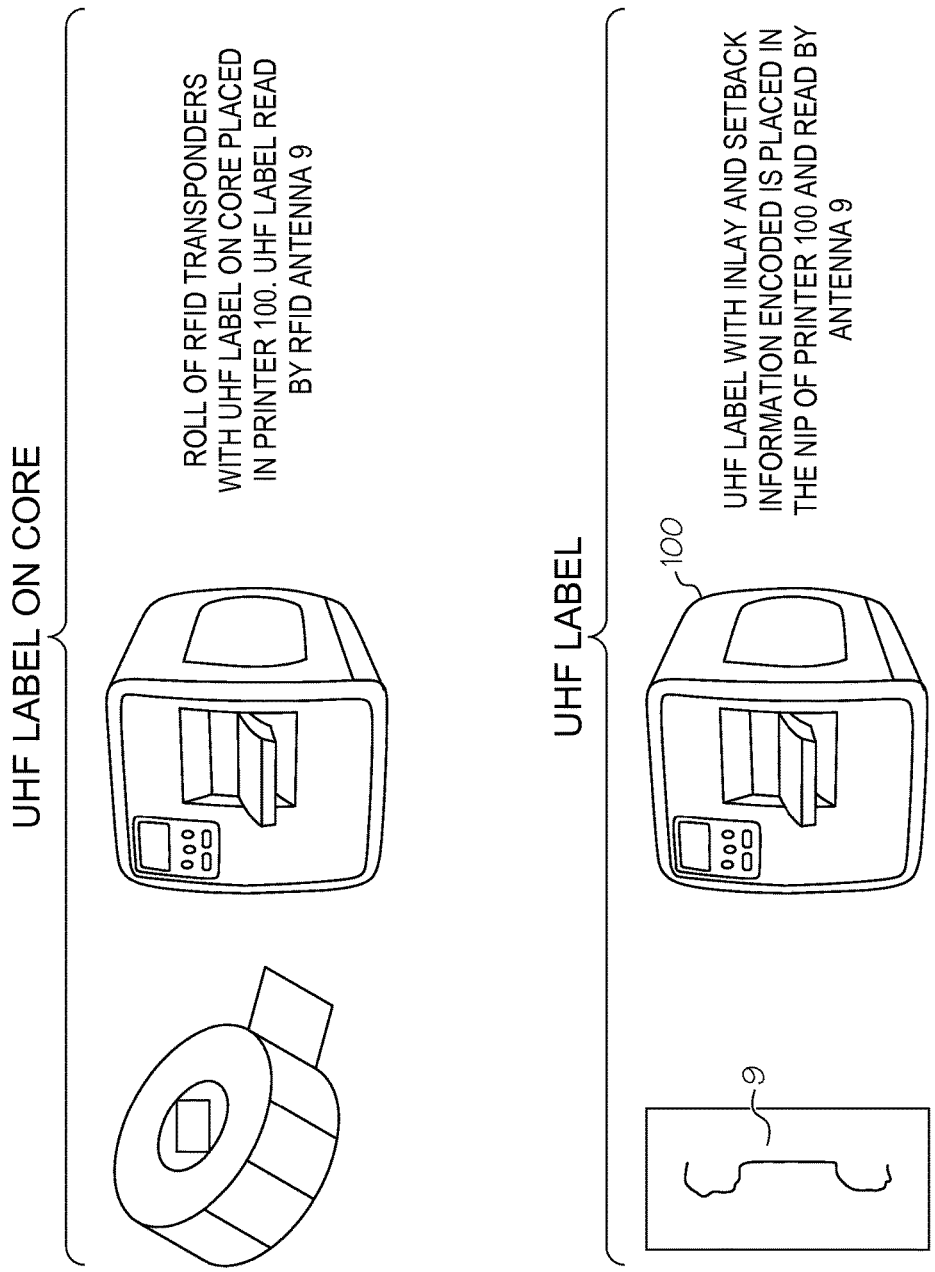
FIG. 12 illustrates the process of using a UHF label either on the supply core or loose in box to update the information in the printer.
Figure 13:
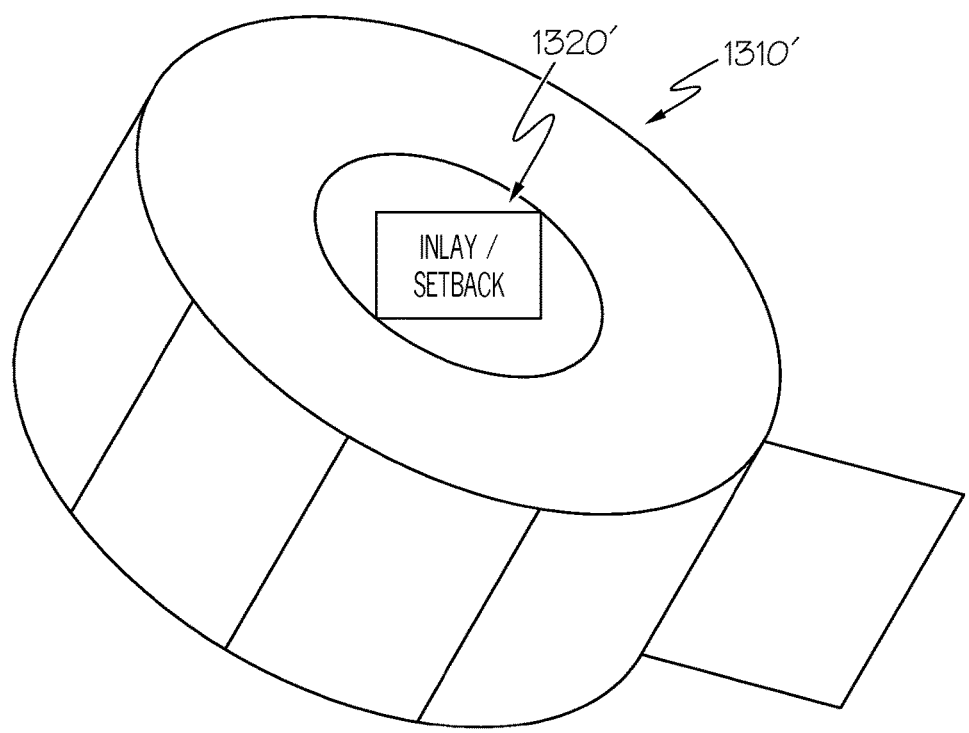
FIG. 13 illustrates a roll of RFID transponders and the label that is placed on the roll.

The roll of RFID labels containing RFID transponders is shown in FIG. 13. Label 1320 contained on core 1310 and shown in FIG. 14. The inlay number and setback distance are programmed on the inlay at the point of manufacture. This NFC tag can then be read by any NFC reader/encoder such as one that would be contained in a smart phone as shown by FIG. 14. The NFC reader/encoder can then be used to send the information to the NFC reader/encoder can then be used to send the information to the I2C NFC Tag (as shown in FIG. 7 23) which can be accessed by the main CPU board (as shown in FIG. 4). This process is shown in the flowchart in FIG. 11. Alternately, label 1320 can contain a UHF inlay programmed with the inlay number and setback distance. This inlay will be read with a high power read on RFID Antenna (as shown in FIG. 1 on antenna 9) or with an RFID antenna embedded in supply holder. This inlay will enable the printer to read the required information from the inlay. Alternately a separate label can be contained with the RFID roll that can be placed over the RFID reader/encoder for the purpose of configuring the printer as shown in FIG. 12.

Figure 8:
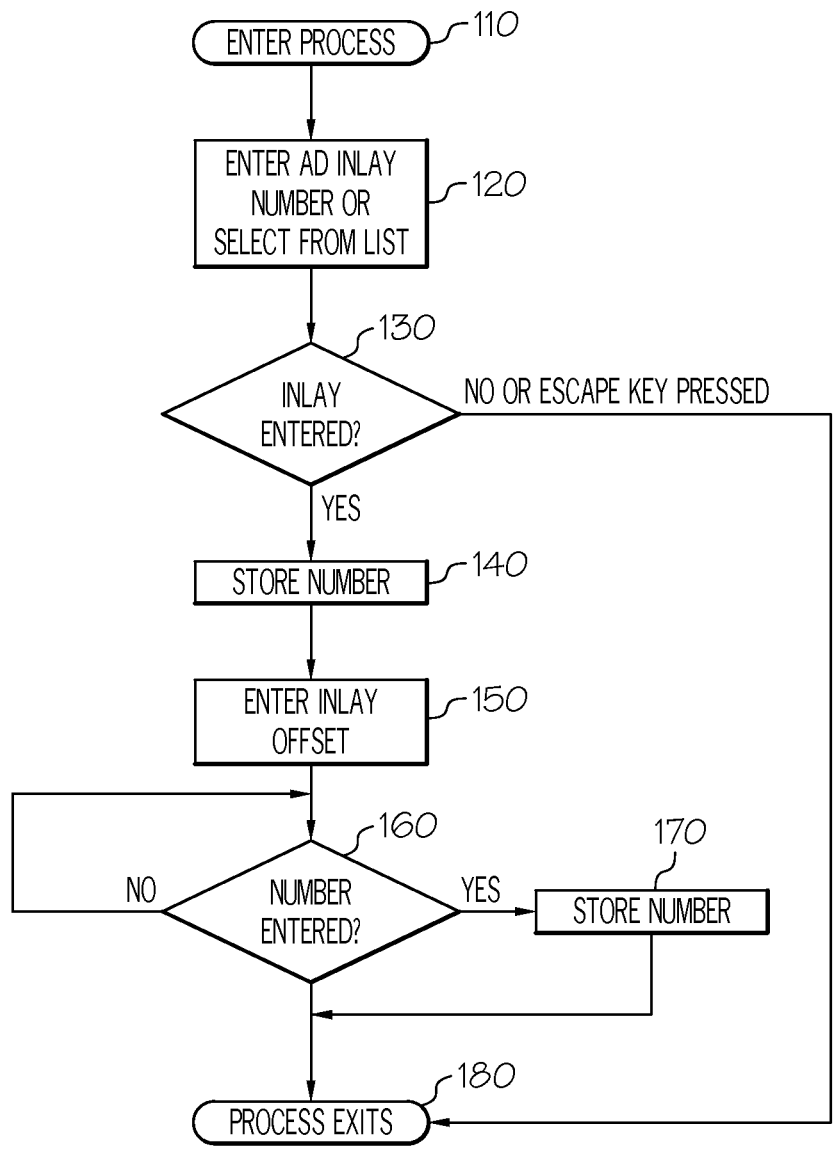
FIG. 8 illustrates a flowchart disclosing the User Prompt phase of the method of the present invention.
Figure 9:
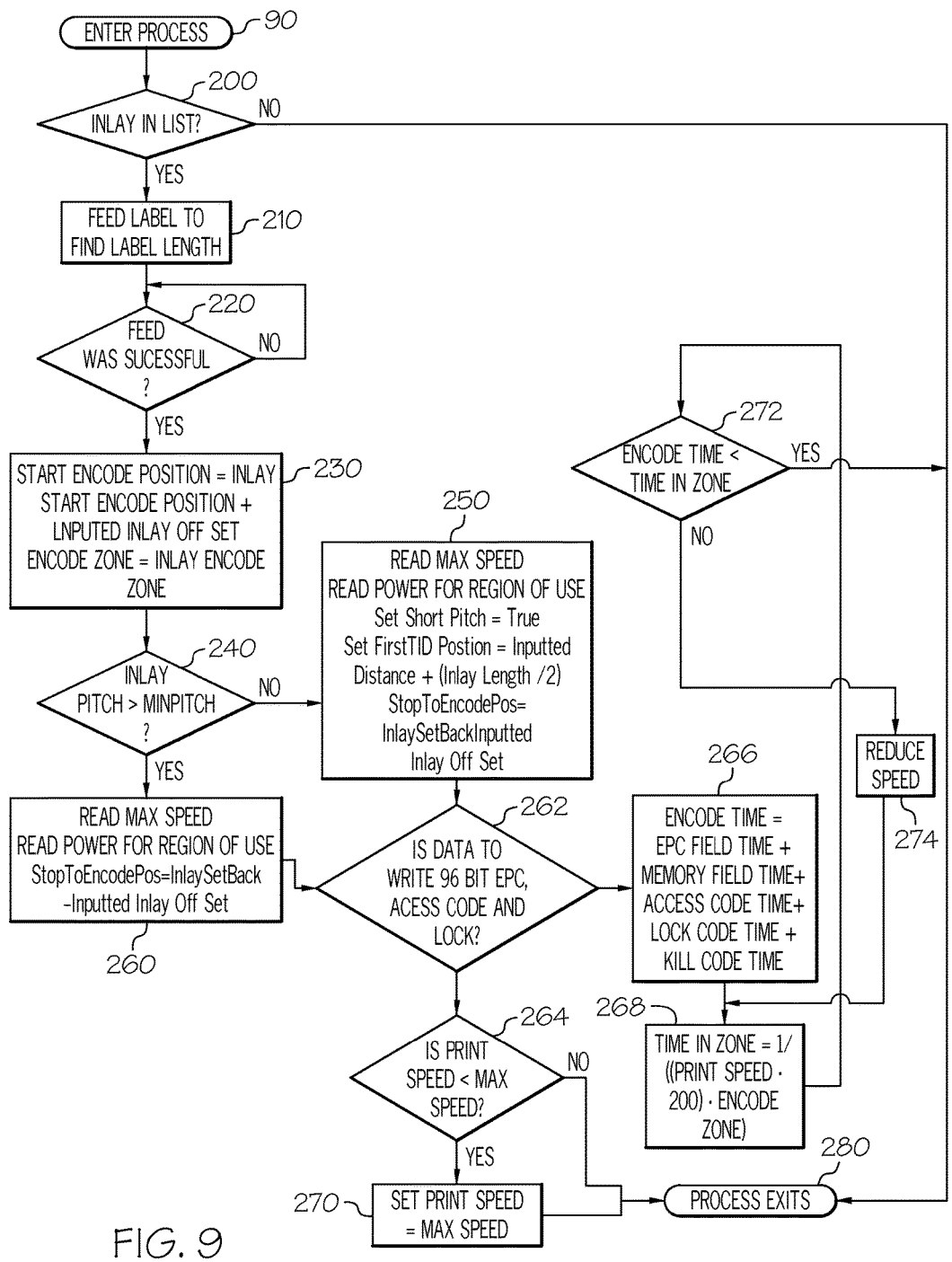
FIG. 9 illustrates a flowchart disclosing the Read Inlay phase of the method of the present invention.
Figure 10:
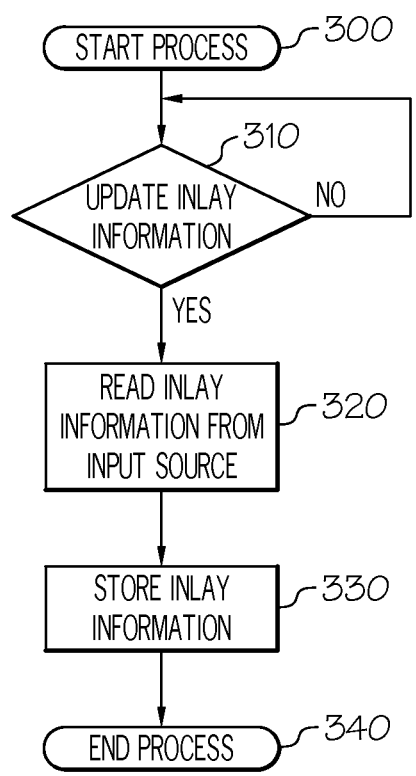
FIG. 10 illustrates a flowchart disclosing the Update Inlay Information phase of the method of the present invention.

Having now described one example of the type of thermal tabletop and/or industrial printer 100 upon which the present invention may be employed, the process of quickly and efficiently configuring printer 100 will now be described. As illustrated in FIGS. 8-10, and described more fully below, the method of the present invention can be generally be described in the following three phases: User Prompt; Read Inlay Information; and Update Inlay Information. An alternate method of Read Inlay Information will be described in FIGS. 11 & 12.

FIG. 8 illustrates a flowchart generally disclosing the User Prompt phase of the method of the present invention, which is preferably an offline process in which a user (not shown) would enter the process at block 110 by placing a label in the printer core and entering or selecting an inlay number or designator (that may be obtained from the label that the user desires to use) at the front screen of printer 100 at block 120 from a list of possible inlays. In the User Prompt phase information is being inputted. Notwithstanding, it is also contemplated that the inlay number/designator could be automatically supplied by the production system. If a user does not have access to an inlay number or designator on a quick configure label or wishes to use RFID media that is not currently in the inlay database, the user will exit the process at block 180.

By way of background, while the use of inlay numbers/designators is well known in the art, their format and location on a label or tag is oftentimes inconsistent, and the designator is not always complete, which can further complicate the printer configuration process as it currently exists. In a preferred embodiment of the present invention, (i) consistent nomenclature would be used for the designator of each label type; (ii) the inlay location would be expressed as a 3-digit integer value, using millimeters as the unit of measure; and (iii) consistent label formats would be utilized at each production site. Further, with respect to (i) above and by way of example, the following format may be used for an inlay designator: "AD-xxxyyyz", wherein AD would represent the identity of the manufacturer, xxx would represent the model number, yyy would represent the chip suffix and z would be N or W for NEL or WEL, or E or F for FCC or ETSI. It is anticipated that both the inlay designator/number and the inlay location could be provided to the user in a consistent location and fashion on the label on a supply core. Of course, other types of designator nomenclature could also be employed without affecting the overall concept of the present invention.

Returning now to FIG. 8, at block 130 a determination is made as to whether the inlay number has been successfully entered (i.e., is currently in the inlay database) or selected from a list of inlays in the inlay database. If the inlay number has not been successfully entered, the User Prompt process will exit at block 180 and the user will need to begin the process again or manually configure printer 100. If, on the other hand, the inlay number has been successfully entered (i.e., it matches an inlay number in the inlay database), the number will be stored in printer 100 at block 140, and the user will be prompted at block 150 to enter the inlay offset (which would also be available on the label), as measured from the sense mark on the label to the top of the label. Recall from above that, in a preferred embodiment, the inlay location would be expressed as a 3-digit integer value, using millimeters as the unit of measure, though other formats and units of measurement could also be employed without affecting the overall concept of the present invention.

At block 160, a determination is made as to whether the inlay offset has been successfully entered. If the inlay offset has not been successfully entered, the user is returned to block 150 and again prompted to enter the inlay offset. If, on the other hand, the inlay offset has been successfully entered, the inlay offset will be stored in printer 100 at block 170 and the User Prompt phase will terminate and exit at block 180.

FIG. 9 illustrates a flowchart generally disclosing the Read Inlay Information phase of the method of the present invention, in which the inputted inlay designator and the inlay offset from the User Prompt phase are used to lookup additional information required for correct operation of printer 100. This process is completed after the printer has been initially configured with the inlay designator and the inlay offset. For correct operation to occur the label length must be know the printer will feed a label to determine the label length. More specifically, when printer/encoder 100 receives a print/encode job or task, the flowchart in FIG. 9 is entered in block 190. At block 200, printer 100 compares the current inlay number to the list of stored inlays to see if a match exists. If the current inlay does not match an inlay in the stored list of inlays, the process exits at block 270. If, on the other hand, the current inlay number matches an inlay in the list of stored inlay numbers, the process continues to block 210 in which printer 100 feeds a label or tag to determine the label's length or inlay pitch. In block 220, a determination is made as to whether the label feed of block 210 was successful. If the label feed was unsuccessful, the process will loop back to block 210 until the feed is successful and the inlay pitch is determined.

Once the label feed is determined to be successful and the label pitch determined, the process proceeds to block 230 in which the start encode position is calculated by adding the inlay start encode position plus the inlay offset inputted at block 150. Printer 100 will also set the encode zone to the inlay encode zone read from the database and the process will proceed to block 240. At block 240, a determination is made as to whether the inlay pitch determined in block 210 is greater or less than the minimum inlay pitch.

If the inlay pitch from block 210 is less than the minimum inlay pitch, a Gen2 RFID TID is required in order to singulate the RFID transponder and the minimum inlay pitch is used, and, at block 250, the maximum print speed, read and write power, region of use and stop to encode position will be automatically configured. From the selected inlay the printer saves the active settings from the database. Additionally, the short pitch will be set to true, and the first TID position will be set to the sum of the inlay offset entered in block 150 plus one half of the inlay length. Further, the stop to encode position is equal to the difference of the selected inlay offset and the inputted inlay offset. The process then proceeds to block 262 to determine if the data to be encoded is the 96 bit epc, access password and lock code which is the typical encode case. In block 264 the current print speed is compared the max print speed for the typical use case of 96 bit EPC, access password and lock code. If the current speed is greater than the max speed in block 270 the current speed is set to the max speed and exits at block 280. If the user is encoding data other than the typical use case the encode time will be determined by accessing the following information in the inlay database: EPC Field Time, User Memory Time, Access Code Time, Lock Code Time and Kill Code time to determine the time to encode in block 266. Alternately printer 100 could perform a sample write to determine the encode time in block 266. In block 268 time in the zone is calculated by determining the speed of one step and multiplying it by the number of steps in the encode zone. In block 272 the Encode Time is compared to the Time in the Zone. If it is less than time in the zone the process exits in block 80. If the Encode Time exceeds the amount of time in the Encode Zone the print speed is reduced and the Encode Time is rechecked in block 274. If no Encode While the Web is moving value can be found the printer will be set to stop to encode. The Read Inlay Information phase then concludes and will exit at block 270.

If the inlay pitch from block 210 is greater than the minimum inlay pitch, a Gen2 RFID TID is not required in order to singulate the RFID transponder and the process proceeds to block 260. At block 260, the maximum encode speed, read and write power, region of use and stop to encode position will be automatically configured. Additionally, if the time required to encode the label exceeds the amount of time printer 100 has available to encode, the printer will stop to encode the label. Further, the stop to encode position is equal to the difference of the selected inlay offset and the inputted inlay offset. The Read Inlay Information phase then concludes and will exit at block 270.

FIG. 10 illustrates a flowchart generally disclosing the Update Inlay Information phase of the method of the present invention, in which the process begins in block 300 by searching for the availability of updated inlay information from one of the printer communication ports, which could include, without limitation, serial, USB host, USB device, near field communication (NFC), blue tooth, wired Ethernet and/or wireless communications. In block 310, printer 100 determines if new or updated inlay information is available from a communication port. If no new inlay information is available, the process loops back to block 300 and waits for new or updated inlay information to become available from a communication port. On the other hand, if new or updated inlay information is available from a communication port at block 310, the new/updated inlay information is read from the input source at block 320 and verified, and stored in printer 100 at block 330. If the inlay information received from the communication port is an update of inlay information already stored in printer 100, the newly received inlay information will replace the old inlay information. Following the storage of the new/updated inlay information at block 330, the Update Inlay Information phase concludes, and will exit at block 340.

In summary, the method of the present invention enables a user to quickly configure a printer, such as an RFID printer, by only entering the inlay designator and the inlay offset and running the firmware in printer 100. Printer settings that can then be automatically configured include, but are not limited to, first TID position, encode zone, TID singulate, RF read power, RF write power, encode while the web is moving flag, stop to encode position and maximum speed to encode while the web is moving.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of configuring one or more settings of an RFID printer comprising the steps of:
    selecting an inlay designator from a list of available inlay designators stored in the RFID printer;
    inputting an inlay offset into the RFID printer;
    feeding a media into the RFID printer to determine an inlay pitch for the media;
    comparing the inlay pitch to a minimum inlay pitch and utilizing a RFID TID to singulate a RFID transponder if the inlay pitch is less than the minimum inlay pitch;
    selecting one of a first RFID printer configuration or a second RFID printer configuration based on results of the comparison and using the inlay offset to configure one or more of the following settings of the printer: a first TID position, an encode zone, a TID singulate, a read power, a write power, an encode while the web is moving flag, a stop to encode position and a maximum speed to encode while the web is moving;
    determining if a typical encode case is applicable and, if so, comparing a current print speed to a maximum speed to encode for the typical encode case; and
    determining if one or more new inlay designators is available from a communication port and updating the list of available inlay designators stored in the RFID printer to include the one or more new inlay designators.

2. The method of claim 1 wherein the first RFID printer configuration is selected if the inlay pitch is greater than the minimum inlay pitch.

3. The method of claim 1 wherein the second RFID printer configuration is selected if the inlay pitch is less than the minimum inlay pitch.

4. The method of claim 1 wherein each of the first RFID printer configuration and the second RFID printer configuration comprises one or more of the following settings: a first TID position, an encode zone, a TID singulate, a read power, a write power, an encode while the web is moving flag, a stop to encode position and a maximum speed to encode while the web is moving.

5. The method of claim 1 further comprising the step of calculating a start encode position for the media by summing (a) an inlay start encode position and (b) the inputted inlay offset.

6. The method of claim 5 further comprising the step of calculating a stop encode position for the media by subtracting the inputted inlay offset from an inlay setback.

7. The method of claim 1 further comprising the step of calculating a first TID position by summing (a) the inputted inlay offset and (b) one half of the inlay pitch.

8. A method of configuring a printer comprising the steps of:
    inputting inlay information into the printer;
    comparing the inputted inlay information to a list of pre-existing inlay information stored in the printer to determine if a match exist;
    if a match exists, inputting an inlay offset into the printer;
    using the inputted inlay information and the inlay offset to configure one or more of the following settings of the printer: a first TID position, an encode zone, a TID singulate, a read power, a write power, an encode while the web is moving flag, a stop to encode position and a maximum speed to encode while the web is moving;
    feeding media into the printer to determine an inlay pitch for the media;
    comparing the inlay pitch to a minimum inlay pitch and utilizing a RFID TID to singulate a RFID transponder if the inlay pitch is less than the minimum inlay pitch;
    selecting one of a first printer configuration or a second printer configuration based on results of the comparison of the inlay pitch to the minimum inlay pitch and updating the list of pre-existing inlay information stored in the printer such that the printer is configured by entering the inlay information and the inlay offset; and
    determining if a typical encode case is applicable and, if so, comparing a current print speed to a maximum speed to encode for the typical encode case.

9. The method of claim 8 wherein the first printer configuration is selected if the inlay pitch is greater than the minimum inlay pitch.

10. The method of claim 8 wherein the second printer configuration is selected if the inlay pitch is less than the minimum inlay pitch.

11. The method of claim 8, wherein the printer is an RFID printer.

12. A method of configuring an RFID printer comprising the steps of:
    inputting an inlay designator into the RFID printer;

determining whether the inlay designator is in a list of available inlay designators stored in the RFID printer and, if so;
inputting an inlay offset into the RFID printer and using the inputted inlay information and the inlay offset to configure one or more of the following settings of the printer: an encode zone, a read power, a write power, an encode while the web is moving flag, a stop to encode position and a maximum speed to encode while the web is moving;
storing the inlay offset in the RFID printer;
feeding a media into the RFID printer to determine an inlay pitch for the media;
comparing the inlay pitch to a minimum inlay pitch and utilizing a RFID TID to singulate a RFID transponder if the inlay pitch is less than the minimum inlay pitch;
selecting one of a first RFID printer configuration or a second RFID printer configuration based on results of the comparison such that the printer is configured by entering the inlay information and the inlay offset;
determining if a typical encode case is applicable and, if so, comparing a current print speed to a maximum speed to encode for the typical encode case; and
calculating a stop encode position for the media by subtracting the inputted inlay offset from an inlay setback.

13. The method of claim 12 further comprising the step of calculating a start encode position for the media by summing (a) an inlay start encode position and (b) the inlay offset.

14. The method of claim 12 further comprising the steps of determining if one or more new inlay designators is available from a communication port and updating the list of available inlay designators stored in the RFID printer to include the one or more new inlay designators.

* * * * *